DUAL MAGNET HEAD ARRANGEMENT ELECTRICALLY CONNECTED TOGETHER FOR BOTH RECORDING AND PLAYBACK

Filed Oct. 17, 1966 2 Sheets-Sheet 1

INVENTOR.
HERMAN K.A. DE LANGE
BY
Frank R. Trifari
AGENT

INVENTOR.
HERMAN K.A. DE LANGE
BY
AGENT

1

3,499,977

DUAL MAGNET HEAD ARRANGEMENT ELECTRICALLY CONNECTED TOGETHER FOR BOTH RECORDING AND PLAYBACK

Herman Kasper Adriaan de Lange, Klosterneuburg, Austria, assignor, by mesne assignments to U.S. Philips Corporation, New York, N.Y., a corporation of Delaware

Filed Oct. 17, 1966, Ser. No. 587,114
Int. Cl. G11b *5/12;* H04n *5/76*
U.S. Cl. 178—6.6 10 Claims

ABSTRACT OF THE DISCLOSURE

A magnet head arrangement of two heads, one for record and one for playback connected with the playback first in the direction of scan of the record carrier. The heads are connected together electrically and each receive both record and playback signals.

Figure 1:
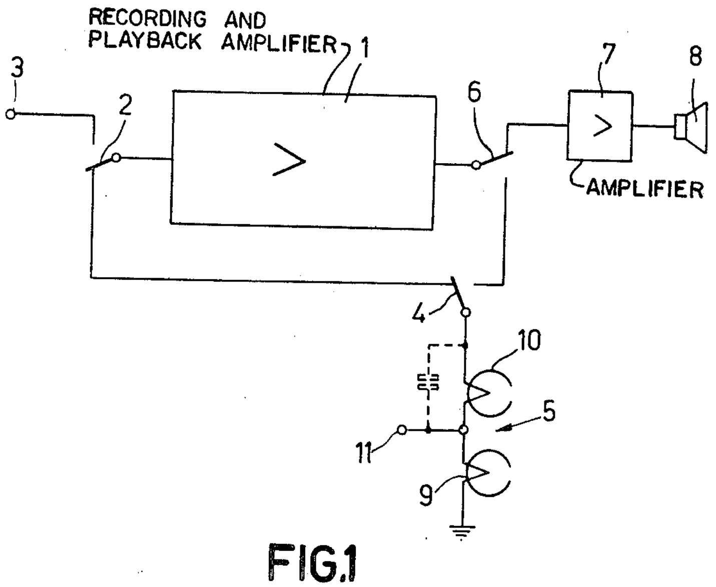

The invention relates to a magnet head arrangement comprising magnetic circuits both for recording and playing back magnetic signals, the effective gaps of the magnetic circuits, viewed in the direction of scanning of the record carrier, being arranged one after the other. In such magnet head arrangements magnetic circuits are available both for recording and playing back, so that these magnetic circuits can be given optimum proportions for the purpose for which they are used. In this case it is not necessary, as in arrangements having only one head which is used both for recording and for playing back, to conclude a compromise as regards proportioning.

According to the invention it is proposed for such a magnet head arrangement that, in the direction of scanning, the magnetic circuit including the play-back gap is arranged before the magnetic circuit including the recording gap and that both in recording and in playing back the electric circuit of the magnetic circuits for recording and playing back are connected together electrically and, in playing back, the signal induced in the magnetic circuit for playing back preferably is at least a factor 10 larger than the signal induced in the magnetic circuit for recording. These measures provide the essential advantage that switching of the magnetic circuits for recording and playing back themselves, in accordance with which of these two operating conditions is required, can be dispensed with. As a result of this the corresponding switches which, as is known, always cause difficulties in the immediate proximity of the magnetic circuits, may be omitted while for such rotating magnet head arrangements the further advantage is obtained that only two connecting wires to the head arrangement are necessary.

The length of the recording gap is preferably chosen to be larger than that of the playback gap. It has further been found of advantage to provide the electric circuit of the magnetic circuit for playing back with a coil having a larger number of turns than that of the magnetic circuit for recording. The number of turns of the coil of the magnetic circuit for playing back is preferably chosen to be large so that the magnetic circuit for playing back is saturated in recording. By these measures it is ensured that, in playing back, the signal induced in the magnet circuit for playing back is considerably stronger than the signal induced in the recording circuit. In addition it is of advantage to connect the electric circuits of the magnetic circuits for recording and playing back in series, one terminal of the electric circuit of the magnetic circuit for recording being connected to the common potential and the high-frequency bias magnetisation signal being supplied to said circuit. The magnetic circuit for playing back is preferably short-circuited electrically for the high-frequency bias magnetisation signal by means of a capacitor.

2

In a magnet head arrangement for a recording and/or playback apparatus for video information, which information is preferably recorded as a frequency-modulated signal, it has been found of particular advantage if the effective gaps of the magnetic circuits for recording and playing back, viewed in the direction of scanning of the record carrier, are arranged at a distance from one another which is determined by two—maximally, however, a few—successive line pulses which are recorded on the record carrier. As a result of this it is reached that, in playing back, the two effective gaps scan information which is exactly spaced apart by one line. Since on an average the information contents of one line to the next vary comparatively little, signals which are induced in the magnetic circuit for recording therefore have a considerably less disturbing effect in playing back, than when the effective gaps were provided at an arbitrary distance. Preferably, the effective gaps of the magnetic circuits for recording and playing back, viewed in the direction of scanning of the record carrier, may be arranged at a distance from one another which is determined by a multiple of successive frame pulses recorded on the record carrier, while adding the distance corresponding to half a line in the case of an odd multiple.

Figure 2:
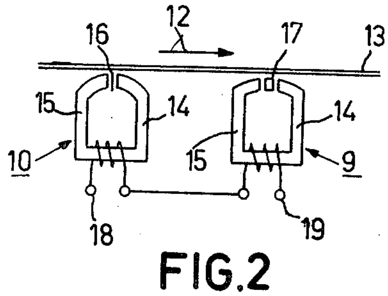
Figure 3:
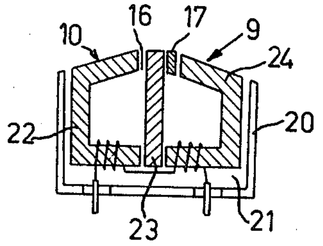
Figure 4:
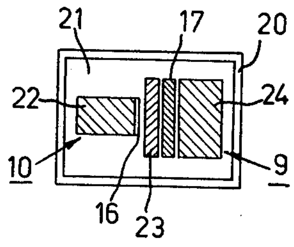
Figure 5:
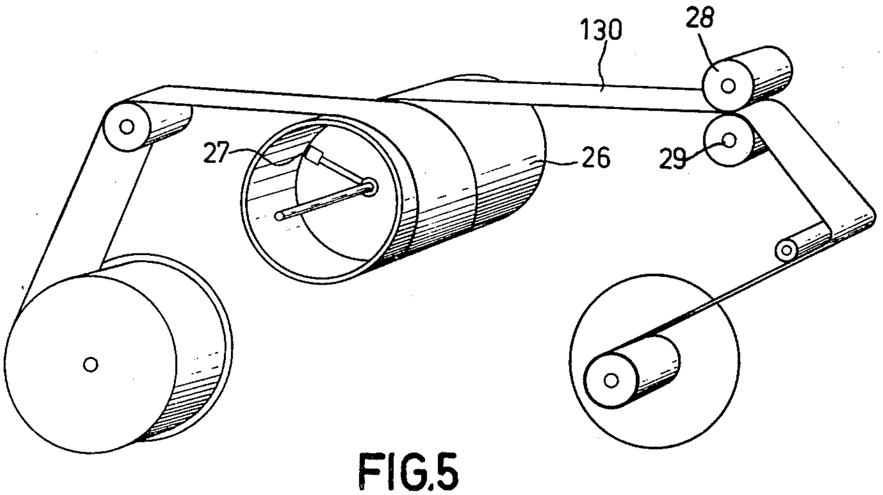

In order that the invention may readily be carried into effect, a few examples thereof will now be described in greater detail, by way of example, with reference to the accompanying drawings, in which FIGURE 1 shows a magnetic arrangement according to the invention connected to a recording and playback amplifier, FIGURE 2 diagrammatically shows said magnetic head arrangement in cooperation with the record carrier, FIGURE 3 diagrammatically shows a cross-sectional view of another embodiment of the magnetic head arrangement in which both magnetic circuits are arranged in a common housing, FIGURE 4 is a plan view of the bearing surface of the magnetic head arrangement shown in FIGURE 3, FIGURE 5 shows a device for recording and playing back video information in which a magnetic head arrangement according to the invention is used.

Figure 6:
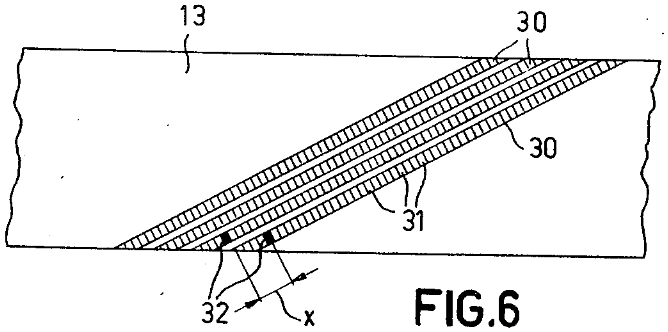

FIGURE 6 diagrammatically shows a few tracks recorded on a record carrier by means of an apparatus shown in FIGURE 5.

Figure 7:
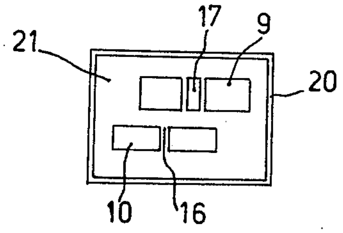

FIGURE 7 diagrammatically shows a magnetic head arrangement for a device shown in FIGURE 5 in which the effective gaps of the magnetic circuits for recording and playing back, viewed in the direction of scanning of the record carrier, are arranged at a distance from one another which is determined by two successive frame pulses and the distance which corresponds to half a line.

In FIGURE 1, reference numeral 1 denotes a recording and playback amplifier to the input of which, in recording the signal to be reocrded is applied through a switch 2 and the terminal 3 and, in playing back, the magnet head arrangement 5 can be connected through a further switch 4. For playing back a loudspeaker 8 can be connected to the output of the amplifier by means of the switch 6 through a further amplifier 7 and, for recording, the magnet head arrangement 5 may be connected through the further switch 4. In FIGURE 1 the switches 2, 4 and 6 are shown in the position for "playback." The magnet head arrangement 5 comprises two magnetic circuits, one (9) of which is destined for recording and one (10) for playing back a signal. The electric circuits of said magnetic circuits are connected in series, one terminal of the electric circuit of the magnetic circuit for recording being connected to the common potential. The high-frequency bias magnetisation signal is applied to the terminal 11 which is connected to the junction of the two electric circuits 9, 10.

FIGURE 2 shows in detail how the two magnetic circuits are arranged relative to the direction of scanning of the record carrier 13 which is denoted by an arrow 12 in recording and playing back respectively. The magnetic circuit consists in normal manner of two U-shaped yoke halves 14, 15 folded with their end faces between which faces an effective gap is formed by means of a gap intermediate member. As shown in FIGURE 2, the magnetic circuit 10 including the playback gap 16, viewed in the direction 12 of scanning, is arranged before the magnetic circuit 9 including the recording gap 17. The gap lengths of the two circuits are such that every gap is optimally effective for the operation for which it is destined, that is to say that the playback gap 16 is considerably shorter than the recording gap 17 which is shown in FIGURE 2 by gap intermediate members having different thicknesses. For clearness' sake said gap intermediate members are exaggeratedly large in the drawing. The electric circuits are each constituted by coils 18 and 19, respectively, provided on the yoke halves of the magnetic circuits which are connected in series as shown in FIGURE 1.

The operation of the device described is as follows: In recording the signal to be recorded appears simultaneously at both magnetic circuits so that both the magnetic circuit for reproducing and the magnetic circuit for playing back magnetize the record carrier accordingly. Since, however, the magnetic circuit for playing back, viewed in the direction of scanning of the record carrier, is arranged before the magnetic circuit for recording, the signal previously recorded by the magnetic circuit for playing back is erased again by the magnetic circuit for recording, while recording a signal, so that finally, as is desired, only one signal, namely the signal recorded by the magnetic circuit for recording, is maintained. Erasing the signal recorded by the magnetic circuit for playing back is effected in this case by the high-frequency bias magnetization signal. This is amply sufficient for this purpose, since the recording by the magnetic circuit for playing back is very weak for several reasons. On the one hand the length of the playback gap is much shorter than that of the recording gap, as a result of which the depth of penetration of the lines for force penetrating from the playback gap into the record carrier is smaller than in the recording gap. On the other hand a lower high-frequency bias magnetization energy is applied to the magnetic circuit for playing back, since the impedance across the magnetic circuit for playing back relative to the common potential as a rule is larger than that across the magnetic circut for recording, so that the recording by the magnetic circuit for playing back likewise is effected with a lower strength. If desired, to strengthen this effect, the magnetic circuit 10, as shown in broken lines in FIGURE 1, may also be short-circuited by a capacitor for the high-frequency bias magnetization signal.

In playback, the recorded signal is scanned by two magnetic circuits, the information contents of the signal scanned by the magnetic circuit for recording and playing back being different since, in fact, said circuits simultaneously scan different places of the record carrier. This would, of course be disturbing since in fact the two signals are added together and thus two different types of information would simultaneously be played back. Since, however, the magnetic circuit for recording is provided with a gap of a larger length, the signal produced in said circuit is very small and can consequently be neglected with respect to the signal occurring in the circuit for playing back and thus is not disturbing. To support this effect the coil of the electric circuit of the magnetic circuit for playing back is preferably constructed with a larger number of turns than the coil of the recording circuit. The number of turns may be chosen to be so large that the magnetic circuit for playing back is saturated in recording. The larger number of turns then also supplies a stronger signal in playing back.

As a result of the above-described measures optimum recording and playing back is obtained without additional switches being required.

In the arrangement described, the magnetic circuits for recording and playing back were spatially separated. However, as diagrammatically shown in FIGURES 3 and 4, the two magnetic circuits may preferably be combined to form one structural unit. In this case the two magnetic circuits are constructed in the known shape of a three-limbed magnet head, the effective gap 16 in the magnetic circuit 10 for playing back again having a smaller length than the effective gap 17 of the magnetic circuit for recording. The two circuits are provided in one housing 20 in which they are fixed, for example, by a moulding mass 21. FIGURE 4 shows a plan view of the bearing surface of the head arrangement. As is shown in this figure, the part 22 of the magnetic circuit for playing back is constructed so as to be narrower in known manner than the parts 23 and 24, respectively, of the magnetic circuit for recording. As a result of this it is achieved that the track recording on the record carrier is wider than the track scanned by the magnetic circuit for playing back. In this manner it is ensured that during playing back the recorded track is always scanned with certainty. Because the playback gap does not leave the recorded track, on the one hand no signal fluctuations can occur and on the other cross-talk by an adjacent track is also excluded.

A magnet head arrangement as described above may also be used advantageously for recording video information. According to one of the known principles for such a recording, the video information is recorded in the form of a frequency-modulated signal in tracks extending on the record carrier at an oblique angle, the carrier frequency also serving as high-frequency bais magnetization. FIGURE 5 shows such an apparatus. In this example, the record carrier 13 is conducted helically over the curved surface of a drum 26 which is divided in two halves in the separating slit of which the magnet head arrangement 27 rotates for recording and playing back the video information. The record carrier is driven by means of a driving shaft 29 cooperating with a pressure roller 28. In this manner, as shown in FIGURE 6 the video information is recorded in tracks 30 extending on the record carrier 13 at an oblique angle.

For such rotating magnet head arrangements 27 it is of particular importance that they have as few electric connections as possible, since the supply of the signals to said connections has to be effected either through the sliding contacts or through a rotating transformer which can provide only two connections. The head arrangement according to the invention can therefore advantageously be used in these cases since a minimum of two connections is sufficient.

In such magnet head arrangement which may be constructed as shown in FIGURES 3 and 4 the effective gaps of the magnetic circuits for recording and playing back, viewed in the direction of scanning of the record carrier, are preferably arranged at a very particular distance from one another, namely such a distance which is determined by two—maximally, however, a few—successive line pulses recorded on the record carrier. In FIGURE 6, the individual line pulses are denoted by lines 31. In this manner it is achieved that signals possibly still occurring in the magnetic circuit for recording during playing back become noticeable in an even less disturbing manner so that it may be assumed that the video information of two adjacent lines, in as far as a black-white step does not exactly occur, will usually not differ much from one another. So in the signals occurring during playing back in the magnetic circuits for recording and playing back it deals in this case with correlated signals so that a signal possibly occurring in the magnetic circuit for recording is even less disturbing. In a frequency-modulated signal, signals occur in the magnetic circuits both for playing back and recording having approximately the same frequency so that adding a signal possibly occurring during playing back in the magnetic circuit for recording to the signal produced in the magnetic circuit for playing back becomes less noticeable in addition because in frequency modulation the amplitude of the signal is unimportant for the information contents.

When the video information is interlaced, that is to say, that a picture is divided into two frames, the effective gaps of the magnetic circuit for recording and playing back, viewed in the direction of scanning of the record carrier, are preferably arranged at a distance from one another which is determined by multiple of successive frame pulses recorded on the record carrier, while adding the distance corresponding to half a line in the case of an odd multiple. As a result of this it is also reached that signals possibly occurring in the magnetic circuit for recording during reproduction are less disturbing. In this case, and in accordance with what is more advantageous for the use of the device, a displacement of the effective gap may be carried out, for example, over a distance of a whole image or only a frame plus half a line in which in the first case the effective gap succeeding in the direction of scanning again runs on the same line and in the second case on the next following line of the other frame.

In FIGURE 6, the frame pulses are denoted by thicker lines 32. In this case, the construction is such that in every track extending on the record carrier at an oblique angle exactly one frame is recorded. FIGURE 7 shows a magnet head arrangement according to the invention for such a device in an elevation on the bearing surface in which the effective gaps are displaced at a distance of a frame plus half a line. The magnetic circuit 9 for recording is displaced in height relative to the magnetic circuit 10 for playing back by the track distance between two tracks 30 and the effective gaps of the two magnetic circuits by the amount *x* shown in FIGURE 6 which appears from the oblique position of the tracks.

Of course, the magnet head arrangements described may be varied in various manners without departing from the scope of the invention. For example, the electric circuits may be arranged in parallel or the magnet head arrangement may be constructed for other recording and playing back arrangements.

What is claimed is:

1. A magnet head scanning arrangement for recording and playing back magnetic signals to and from a record carrier, comprising a first magnetic circuit having a recording gap for recording, a second magnetic circuit having a playback gap for playing back, said second magnetic circuit being arranged before the first magnetic circuit in the direction of scanning of said record carrier, a first electrical circuit associated with said first magnetic circuit, a second electrical circuit associated with said second magnetic circuit, means for applying a recording signal to both of said first and second electrical circuits, and means connected to both of said first and second electrical circuits for receiving a playback signal, said second electrical circuit producing a playback signal with a magnitude substantially in excess of the playback signal reproduced by said first magnetic circuit.

2. A magnet head scanning arrangement for recording and playing back magnetic signals to and from a record carrier, comprising a first magnetic circuit for recording, a second magnetic circuit for playing back, said second magnetic circuit being arranged before the first magnetic circuit in the direction of scanning of said record carrier, a first electrical circuit associated with said first magnetic circuit, a second electrical circuit associated with said second magnetic circuit, means for applying a recording signal to both of said first and second electrical circuits, said second magnetic circuit recording said recording signal on said carrier and said first magnetic circuit erasing the signal recorded by said second magnetic circuit and re-recording said recording signal on said carrier, and means connected to both of said first and second electrical circuits for receiving a playback signal, and means coupled to said second magnetic circuit for reproducing said recorded signal with a magnitude substantially in excess of the magnitude of the signal reproduced by said first magnetic circuit.

3. A magnet head arrangement as claimed in claim 1 wherein the length of the recording gap is larger than that of the playback gap.

4. A magnet head arrangement as claimed in claim 1 wherein said second electric circuit is provided with a coil having a larger number of turns than said first electric circuit.

5. A magnet head arrangement as claimed in claim 4 further including means for saturating said second magnetic circuit during recording.

6. A magnet head arrangement as claimed in claim 1 wherein said first and second electric circuits are connected in series, said first electric circuit connected between a common potential and means applying a high-frequency bias magnetization signal.

7. A magnet head arrangement as claimed in claim 1 wherein said recording gap is wider in a direction transverse to record carrier travel than said playback gap.

8. A magnet head arrangement as claimed in claim 1 wherein video information is recorded line by line as a frequency-modulated signal, and said recording and playback gaps, viewed in the direction of scanning of the record carrier, are arranged at a distance from one another of at least two successive line pulses recorded on the record carrier.

9. A magnet head arrangement as claimed in claim 1 wherein interlaced video frame information is recorded line by line as a frequency-modulated signal, and said recording and playback gaps viewed in the direction of scanning of the record carrier, are arranged at a distance from one another of a multiple of successive frame pulses recorded on the record carrier, plus the distance corresponding to half a line in the case of an odd multiple.

10. A magnet head arrangement as claimed in claim 5 further including a capacitor connected across said second electrical circuit for bypassing said high frequency bias magnetization signal.

References Cited

UNITED STATES PATENTS

| | | | |
|---|---|---|---|
| 3,152,223 | 10/1964 | Wessels. | |
| 3,304,370 | 2/1967 | Johnson | 179—100.2 |
| 3,353,168 | 11/1967 | Poumakis. | |

FOREIGN PATENTS

| | | |
|---|---|---|
| 562,125 | 8/1958 | Canada. |

OTHER REFERENCES

Magnetic Tape Instrumentation, Gomer L. Davies, McGraw-Hill Book Co. Inc., 1961.

JOHN W. CALDWELL, Primary Examiner

D. E. STOUT, Assistant Examiner

U.S. Cl. X.R.

179—100.2